May 15, 1928. 1,669,657
R. DUNKEL ET AL
MACHINE FOR ROPING STRAW OR OTHER VEGETABLES
Filed Feb. 10, 1926 3 Sheets-Sheet 1

Inventors
Richard Dunkel
Albert Wilde
BY: Ruegg, Boyce & Bakeler
ATTORNEYS.

May 15, 1928.                                               1,669,657
R. DUNKEL ET AL
MACHINE FOR ROPING STRAW OR OTHER VEGETABLES
Filed Feb. 10, 1926          3 Sheets-Sheet 2
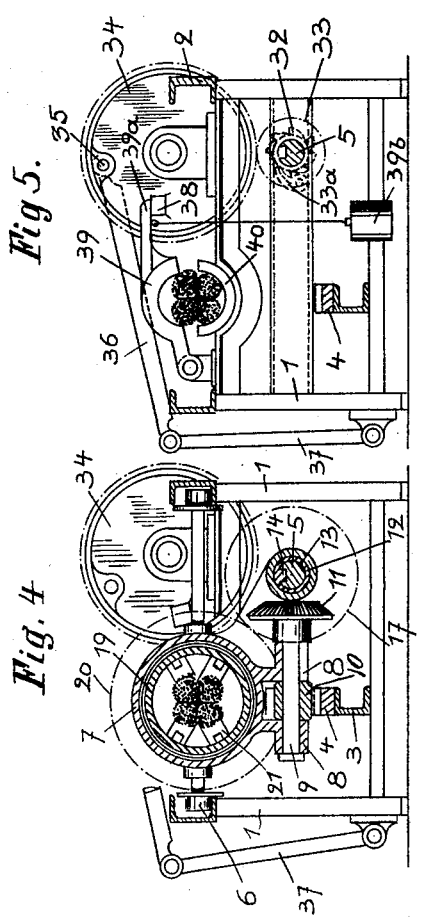
Inventors
Richard Dunkel
Albert Wilde
BY: Ruegr, Boyne & Bakelar
ATTORNEYS.

May 15, 1928.                                               1,669,657
R. DUNKEL ET AL
MACHINE FOR ROPING STRAW OR OTHER VEGETABLES
Filed Feb. 10, 1926            3 Sheets-Sheet 3
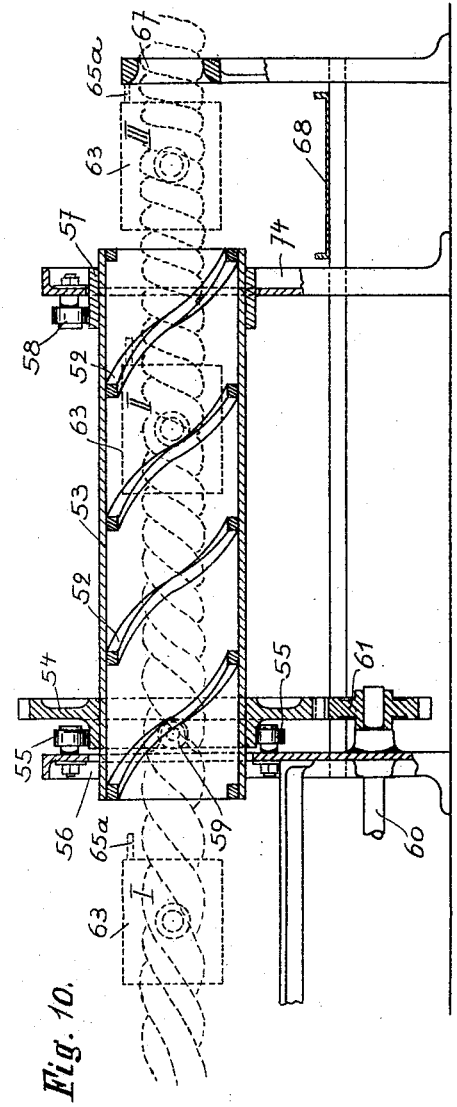
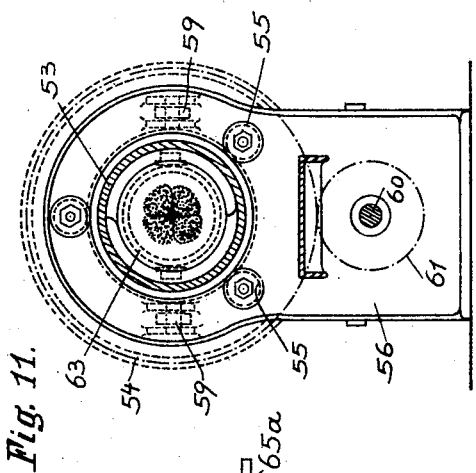
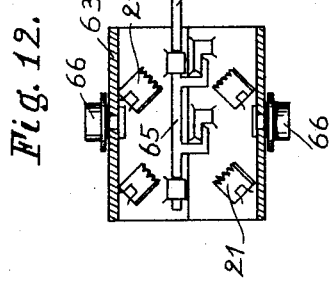
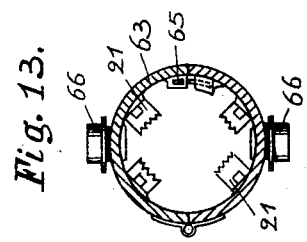
Inventors
Richard Dunkel
Albert Wilde
BY
ATTORNEYS.

Patented May 15, 1928.

1,669,657

UNITED STATES PATENT OFFICE.

RICHARD DUNKEL, OF GUT HARTELANGENVORWERK, AND ALBERT WILDE, OF LOEWENBERG, GERMANY.

MACHINE FOR ROPING STRAW OR OTHER VEGETABLES.

Application filed February 10, 1926, Serial No. 87,216, and in Germany February 16, 1925.

This invention has for its object to produce a machine, by means of which loose straw or other vegetables may be twisted so as to form a big and compact rope. The big ropes manufactured according to the invention are not intended to serve as binding ropes, this being impossible already with regard to their large diameter, but to enable the straw or the like to be stored up and transported in this roped condition, to save space. In particular the object of the new machine is to replace the well-known usual bale-presses, by means of which the straw or the like is pressed into the form of bales by means of binding means. An important advantage, therefore, is offered by the new machine in that any use of binding means, for example wire, is entirely dispensed with. Thus the danger is further obviated of portions of such binding wires remaining in the cattle food, if food vegetables are twisted into such bales.

The invention firmly comprises means for manufacturing individual strands and means for twisting them, the latter means comprising a member receiving said individual strands and holding them, and being moved lengthwise and rotated about its axis.

The invention further comprises improvements of the means for twisting the individual strands.

The machine further shows a mechanism for cutting off the finished product, improved feeding means and means for twisting the individual strands the roped bale consists of.

Two preferred embodiments of the subject-matter of the invention are illustrated by way of example in the drawings which accompany and form part of this specification; these drawings showing machines adapted for twisting a four-strand roped bale.

Figure 1:
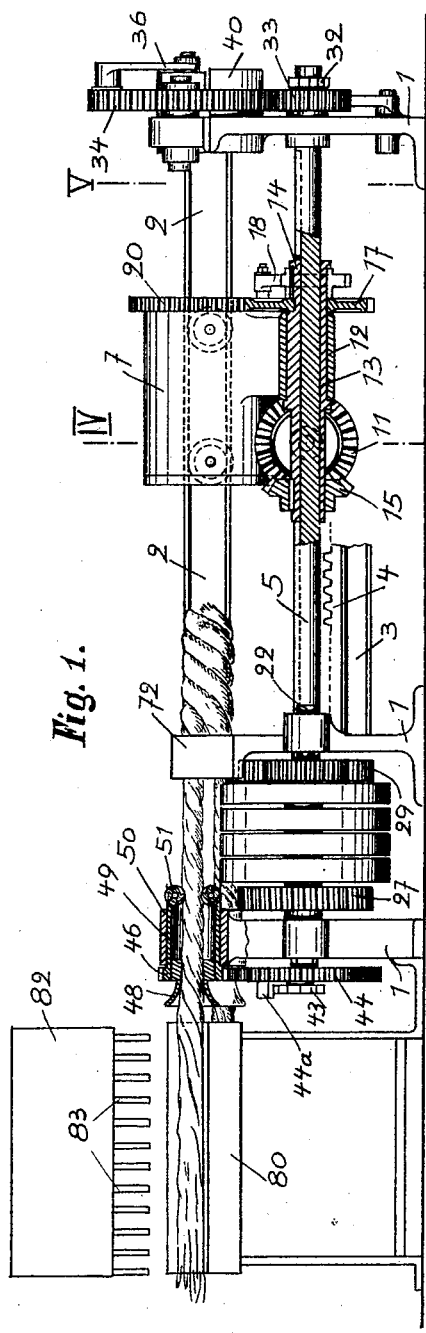
Fig. 1 is a sectional elevation of the first embodiment of the machine.

Fig. 3 is a more diagrammatic front view, showing the driving means for the cylinders twisting the individual strands, Fig. 4 is a section on line IV—IV of Fig. 1, showing the main twisting cylinder and its driving means, Fig. 5 is a section on line V—V of Fig. 1 showing the cutting mechanism for the finished roped straw bale, Figs. 6 to 8 are sectional views showing in detail one of the cylinders twisting the individual strands, Fig. 9 is a front view of the feeding mechanism, Fig. 10 is a fragmentary sectional view of the second embodiment of the machine, Fig. 11 is a left-hand front view thereof, Figs. 12 and 13 illustrate the roping means in longitudinal and cross section, respectively.

The embodiment illustrated in Figures 1 to 8 will be described first. Referring to these figures, 1 denotes the feet or standards of the machine connected to one another by two upper U-iron girders 2 and a middle lower girder 3 which has mounted upon it a rack 4, see Figs. 1 and 4. A grooved shaft 5 is horizontally mounted for rotation in the frame of the machine and constitutes the main drive shaft thereof, all the individual motions of the elements of the machine being derived from this shaft 5. Said two U-iron girders 2 form the track for the wheels 6 of a carriage which comprises the main twisting mechanism of the machine. This carriage has a cylinder 7, Figs. 1 and 4, carrying said running wheels 6 and two bearing eyes 8, 8 on its underside. A cross shaft 9 is lodged in these eyes and has mounted on it a pinion 10, engaging the rack 4, and a bevel wheel 11. A second bearing 12 is carried by cylinder 7, wherein a long sleeve 13 is lodged through which the grooved shaft 5 passes. Sleeve 13 has a spline 14 engaging the groove of shaft 5 thus causing sleeve 13 to rotate with shaft 5. Sleeve 13 has further fixed on it a bevel wheel 15 in mesh with bevel wheel 11, so that travelling motion is imparted through the parts 11, 9, 10, 4 to cylinder 7 upon shaft 5. Finally, a loose spur wheel 17 and a fixed ratchet wheel 16 are mounted on sleeve 13, a pawl 18, engaging ratchet wheel 16 being pivoted on spur wheel 17, so that the latter is able to rotate only in one direction.

The cylinder 7 surrounds a sleeve 19 adapted to rotate therein and having fixed on it a spur wheel 20 which is in mesh with said loose wheel 17. On the inner shell surface of sleeve 19 are pivoted prongs 21 adapted to engage the straw rope passing through sleeve 19, and causing it, upon sleeve 19 rotating, to rotate with it and thus to be twisted and simultaneously drawn towards the right. If necessary small springs may be provided in order to always press the prongs 21 towards the rope.

Figure 2:
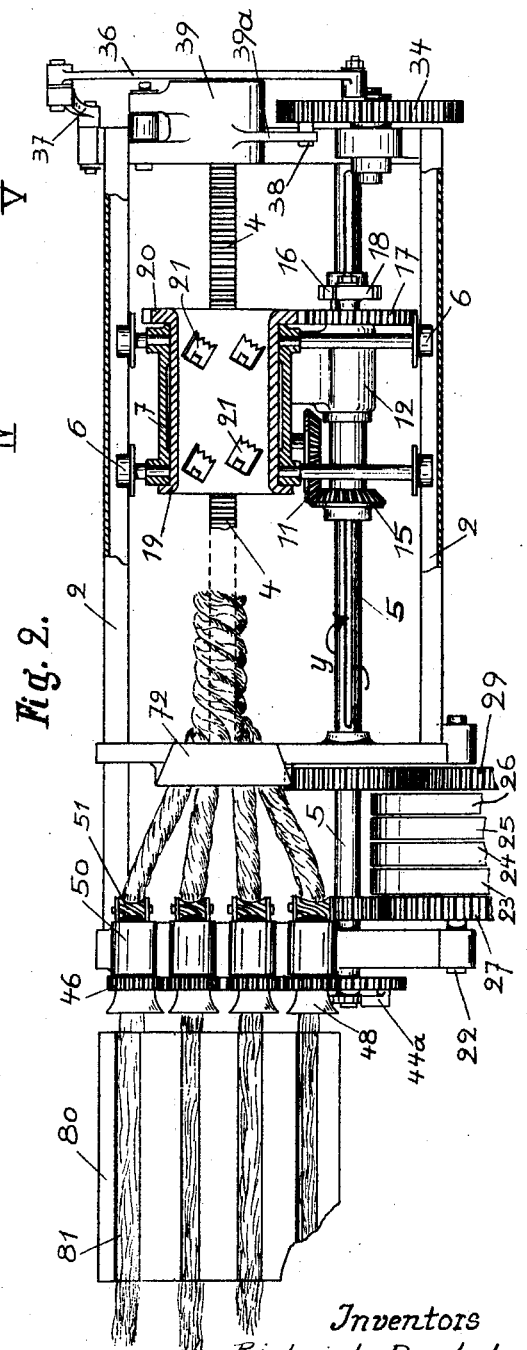
Fig. 2 is the corresponding top view, the feeding hopper being removed.

Main shaft 5 is driven by a gear, best seen in Fig. 2 and comprising a fixed shaft 22 and four belt pulleys 23, 24, 25, 26 loosely mounted thereon. Pulley 23 is coupled with a spur wheel 27 in mesh with pinion 30 rigid on shaft 5, pulley 26 is coupled with a spur wheel 29 in mesh with spur wheel 31 likewise fixed on shaft 5. Pulleys 24 and 25 are adapted to lead the belts when the machine is at rest, an open and a crossed belt being used to rotate shaft 5 in the one or the other direction. The belt changing over means are of any suitable construction and not shown in the drawing for the sake of clearness.

The cutting mechanism is situated on the right-hand end of the machine, see Figs. 1, 2 and 5. On the right-hand end of shaft 5 is fixed a ratchet wheel 32, on the extended hub of which runs loosely a spur wheel 33 engaging a spur wheel 34 and having pivoted on it a pawl $33^a$ engaging ratchet wheel 32. Spur wheel 34 carries a crank tap 35 to which a knife 36 is linked. The other end of knife 36 is linked to a rocking lever 37 pivoted on the frame of the machine, as shown in Fig. 5. The spur wheel 34 further carries a lug 38, cooperating with the projection $39^a$ of the cover 39 of the delivery trough 40, as hereinafter described.

The feeding mechanism is arranged on the left-hand side of the machine, see Figs. 1, 2 and 9. It consists of a table 80 having four horizontal feed gutters 81 into which the straw is put by hand. Above the table 80 is mounted a feeding hopper 82 which receives the straw ejected by the thrashing machine, and the delivery slot of which shows a grate on each side, the bars 83 thereof alternately being rigid and flexible, always a flexible bar of one grate facing a rigid bar of the other grate. The object of this arrangement is to allow for the straw to very easily be taken in the required quantity from the hopper 82 by the operators and put into the gutters 81.

The mechanism for twisting the individual strands is shown in Figs. 1, 2, 3 and 6 to 8.

The main shaft 5 has fixed on its left-hand end a ratchet wheel 43, see Fig. 3, and carries loosely a spur wheel 44 on which is pivoted a pawl $44^a$ cooperating with said ratchet wheel 43. The wheel 44 is in mesh with an intermediate wheel 45, rotating upon a blank shaft $45^a$, and in mesh with four pinions 46 rotating each one of the twisting cylinders 49. These cylinders 49 are made integral with said pinions 46 and rotate in a shell 50, the shells 50 being mounted on the respective standard 1 of the machine. The twisting cylinders 49 are substantially of the known construction. As the usual clamping rollers, however, do not work satisfactorily in twisting so big strands as to be made by the present machine, a new arrangement and configuration has been given to these rollers, illustrated in detail in Figs. 6 to 8. These clamping rollers 51 are mounted on cross axles $51^a$ and have a double conical shape and teeth running along screw lines and being of a profile like the teeth of a ratchet wheel. The pitch of the screw lines is so chosen that it will nearly meet that of the windings of the strands, the roller teeth thus engaging the gaps between the straw halms. The axes $51^a$ of each pair of rollers 51 are connected in the manner shown by Fig. 8 by springs so that the rollers 51 are powerfully urged against the strand and clamp it between them so that the rotation of cylinders 49 is transferred to the strand and the desired twisting effect is secured.

Before entering the twisting cylinders 49 the straw passes through narrowed mouth pieces 48 fixed thereon and the object of which is to smooth the straw and to cause a certain braking effect on it. Due to this braking the windings already become somewhat faster between mouth-piece 48 and roller 51 than in the gutters 81. After leaving the twisting cylinders 49 the strands pass a collecting piece 72 which unites the four strands and makes them ready to enter the main twisting sleeve 19 by the rotation of which the final twisting into a big rope is effected.

The described machine operates as follows:

The open belt running on pulley 26 rotates it in the direction of arrow $x$, Fig. 3. The cross belt running on pulley 24 rotates the latter in inverse direction. Pulley 26 takes with it pinion 29 and spur wheel 31 so that main shaft 5 rotates in the direction of arrow $y$, Fig. 2. Consequently carriage 7, 19 will travel along track 2 towards the right through the intermediary of sleeve 13, bevel wheels 11, 15 and pinion 10 and draws with it the rope, passing through sleeve 19, by means of the prongs 21. During this travel the four strands are drawn through the twisting cylinders 49 and piece 72 and at the same time twisted so as to form a big rope, by the rotation of sleeve 19, this rotation being effected by that the ratchet wheel 16 mounted on sleeve 13 rotates with the latter and transfers its rotation by pawl 18 to pinion 17 and thus to spur wheel 20.

As the ratchet wheel 43 mounted on the left-hand end of main shaft 5 takes with it, by pawl $44^a$, the pinion 44, the twisting cylinders are rotated by gear 45, 46 and twist the individual strands in the described manner. When the carriage 7, 19 approaches the end of its track, it strikes in a well-known manner a suitable lever (not shown) which changes the belt drive over so that the crossed belt becomes operative. As all the described gears now will rotate in inverse direction, the ratchet wheels 16 and 43 will release their pawls 18 and 44ª, respectively, so that both the twisting cylinders 49 and sleeve 19 come to standstill. Merely pinion 10 engaging rack 4 continues to run, but in inverse direction so that carriage 7, 19 will return to its initial position, the prongs 21 releasing the finished rope and gliding loosely over it.

When said inverse rotation of main shaft 5 begins, pawl 33ª engages ratchet wheel 32 thereby rotating the gear 33, 34. As soon as wheel 34 begins to rotate, lug 38 rises and becomes disengaged from projection 39ª of clamping cover 39 so that the latter falls down by action of weight 39ᵇ and clamps the finished rope in the trough 40. In the further course of rotation of wheel 34 the knife 36 is moved downwards and cuts off that portion of the rope which projects beyond the trough 40 and has been finished in the previous operation of the machine. Finally wheel 34 reaches again its position shown in Fig. 5, lug 38 lifting cover 39 so that the rope is able to glide unhindered over trough 40, and knife 36 assumes again its uppermost position.

Shortly before the carriage 7, 19 has reached its left-hand end position, it strikes against a suitable lever (not shown) which causes the belt drive to be changed over into forward running position. A new twisting operation of the machine then may begin.

While the machine hereinbefore described is preferably adapted to make roped bales of a determined length, the embodiment shown in Figs. 10 to 13 is adapted to form roped bales of any desired length.

The arrangement of the feeding hopper and gutters, of the single twisting cylinders 49 and of collecting piece 72 is the same as in the first embodiment. The device for drawing and twisting the rope, however, is formed by cylinders adapted to be moved through a drum having screw threads, and to be rotated at the same time about their axis. This drum 53, see Figs. 10 and 11, has inside ribs 52 running in screw lines of rapid motion and is thus adapted to draw the cylinder 63 through itself and to turn it simultaneously so that a twisting of the strands held by said cylinder 63 takes place. Three or more of these cylinders 63 preferably belong to the machine. The drum 53, which forms so to say a long screw nut, has fixed on its one end a spur wheel 54, the enlarged hub of which is supported by three rolls 55 mounted on the respective standard 56 of the machine. On the other end of drum 53 is fixed a ring 57 likewise supported by three rolls 58 mounted on standard 74. Two rolls 59 are further mounted on standard 56 against which abuts the side face of spur wheel 54 and the object of which is to take up the high side pressure exerted by drum 53 during operation.

The main drive shaft 60, carrying a fixed and a loose belt pulley (not shown), drives the single strand twisting cylinders and, by pinion 61, the drum spur wheel 54.

The cylinder 63, Figs. 12 and 13, is formed by two sheet-metal halves linked to one another as shown and adapted to be locked in closed position by a bolt 65, which has an extension 65ª projecting beyond the cylinder in the direction of forward motion thereof. Two rolls 66 mounted on the outer shell surface of cylinder 63 are adapted to run on the ribs 52 of drum 53. Prongs 21 are pivotally mounted in the cylinder 63 similar to those of the first embodiment.

This machine operates as follows:

It may be assumed that the machine has already finished a certain section of rope and is running. Then the operator takes one of the cylinders 63, puts it around the rope in position I, Fig. 10, and with the prongs 21 directed towards the drum 53, and closes it by bolt 65. Owing to another of cylinders 63 still operating within drum 53, the first-named cylinder 63 is moved towards the drum together with the rope, so that the rolls 66 engage the ribs 52 and the cylinder 63 begins to ascend the ribs 52 by the rolls 66. As soon as the four strands which are taken with by cylinder 63, have been tensioned to a certain degree, the rolls 66 do not longer ascend due to this resistance, but the ribs 52 glide away under them, while the cylinder 63 begins to take part in the rotation of drum 53 so that the four strands become twisted, as they must rotate too owing to the prongs 21 engaging them. When the highest twisting effect is reached and a further twisting of the strand-section in consideration is impossible, the cylinder 63 does not longer rotate but begins again to screw itself into drum 53 a further section of its way, taking with it a new section of untwisted strands. When they are sufficiently tensioned, rotation of cylinder 63 and of the strands and twisting of them takes place anew.

As experience has shown, these two operations, viz., drawing-in and twisting the strands, do not take place successively, but so to say overlap each other, so that a nearly uniform forward motion of the cylinder 63 is attained.

When the cylinder 63 in question has reached the position II of Fig. 10, then the operator puts another cylinder 63 on the strands at position I, this cylinder 63 then operating as described. In the meantime the foremost cylinder approaches to position III, the second, assuming position II being now the sole to twist. When the foremost cylinder has reached position III, the extension 65ª of bolt 65 strikes the wall of a guide-hole 67, provided on the frame, Fig. 1, thus releasing bolt 65, so that the cylinder is opened and falls down onto table 68 where it is taken away by the operator and put again onto the strands in position I. In this manner a continuous twisting operation is secured so that a very long rope may be delivered by the machine.

Claims:

1. A machine for manufacturing roped bales of straw or other vegetable fibers, comprising means for manufacturing individual strands and a device for twisting said strands together, said device comprising a member adapted to receive said strands and to hold them and means for moving said member lengthwise and rotating it about its axis.

2. A machine for manufacturing roped bales of straw or other vegetable fibers, comprising means for manufacturing individual strands and a device for twisting said strands together, said device comprising a hollow member having pivoted prongs to hold said strands and means for moving said member lengthwise and rotating it about its axis.

3. In a machine as specified in claim 1, rotatable cylinders adapted to twist the individual strands, clamping rollers mounted on each of said cylinders having a double conical shape, clamping ribs on the shell surface of said rollers extending along screw lines of a pitch corresponding approximately to that of the threads of the strand.

4. A machine for manufacturing roped bales of straw or other vegetable fibers, comprising means for manufacturing individual strands, a fixed collecting piece for uniting said strands and a device for twisting the strands together, said device comprising a member movable lengthwise and rotatable about its axis.

5. A machine for manufacturing roped bales of straw or other vegetable fibers, comprising means for manufacturing individual strands and a device for twisting said strands together, said device comprising a rotatable drum having internal screw threads and a cylinder movable along the said screw threads.

6. A machine for manufacturing roped bales of straw or other vegetable fibers, comprising means for manufacturing individual strands and a device for twisting said strands together, said device comprising a rotatable drum having inside ribs running in screw lines and a cylinder carrying rollers adapted to run on the ribs of said drum.

7. A machine for manufacturing roped bales of straw or other vegetable fibers, comprising means for manufacturing individual strands and a device for twisting said strands together, said device comprising a rotatable drum having internal screw threads and a cylinder movable along the said screw threads and formed by two halves linked to one another, a bolt adapted to lock said halves when in closed position, an extension on said bolt projecting beyond the cylinder in the direction of forward motion thereof.

In testimony whereof we have signed our names to this specification.

ALBERT WILDE.
RICHARD DUNKEL.